UNITED STATES PATENT OFFICE.

JOHN BEATTIE, JR., OF WESTPORT, MASSACHUSETTS.

BATTERY-ZINC.

SPECIFICATION forming part of Letters Patent No. 359,835, dated March 22, 1887.

Application filed October 22, 1886. Serial No. 216,941. (No specimens.)

*To all whom it may concern:*

Be it known that I, JOHN BEATTIE, Jr., a citizen of the United States, residing at Westport, in the county of Bristol and State of Massachusetts, have invented certain new and useful Improvements in Battery-Zincs and in the Process of Manufacturing the Same; and I do hereby declare that the following is a full, clear, and exact description of the invention, which will enable others skilled in the art to which it appertains to make and use the same.

Heretofore zincs for galvanic batteries have commonly been amalgamated after having been formed into shape for use. When this process of amalgamation is employed, only the surface of the zinc unites with the mercury. It follows that as the zinc dissolves in use the amalgam is destroyed and very soon the zinc is in no better condition than if the surface had never been amalgamated.

I propose to make a battery-zinc in which the whole body of the zinc is amalgamated; and to this end I carry on the process of amalgamation while the zinc is in a molten or fluid state. I am aware that attempts have hitherto been made to accomplish the same result; but so far as I know the process has been such that the mercury would volatalize in great measure before the state of amalgamation was reached. I avoid this by employing a method which I will now proceed to describe. I take lead, in the form of sheet-lead, and add to it a small quantity of arsenic, and put them into a ladle or crucible containing mercury. I then apply just heat enough to cause the lead to be dissolved without evaporating the mercury—that is to say, it will require but a very slight degree of heat to bring the mercury to the condition where it will dissolve the lead, and this degree is below the boiling-point of mercury. When the lead is dissolved, I add a small quantity of carbonate of sodium, and then pour this lead amalgam into molds and allow it to solidify. In general, I prefer to have it molded into the form of rods, say one-half an inch in diameter by six inches long. I then melt a quantity of zinc in a crucible, and add the lead amalgam to the zinc while in a molten state. In carrying out this part of the process I prefer to place each rod of the lead amalgam in tongs so shaped as to inclose said rod, the tongs being perforated so as to allow the molten zinc to come in contact with the amalgam. If, now, the tongs are moved vigorously, so as to stir the molten zinc, the amalgam will be attacked by the heated metal and thoroughly taken up. By taking the precaution of inclosing the amalgam in tongs, as above described, it is prevented from settling to the bottom of the crucible, where it would be difficult to bring it thoroughly into contact with the mass of molten zinc. The function of the arsenic is to help the union of lead and zinc. That of the sodium is to help the union of the zinc and the mercury.

While I have described the process of combining zinc with an amalgam of lead, I may substitute tin for the latter metal, and in some cases I prefer so to do.

As to the proportions necessary to be employed in forming my zinc amalgam, they should be varied according to circumstances. For zincs intended to be used in Leclanché or other sal-ammoniac batteries the quantity of mercury should be less than for zincs designed for Grove, Bunsen, or other similar batteries.

Instead of employing sheet-lead and adding arsenic, I may use lead in the form of shot which contains arsenic in proper quantities.

The lead amalgam may be added to the zinc as soon as the latter is heated enough to take the form of powder, and in fact I have secured good results by combining the zinc and the amalgam in this way.

Having now described my invention, what I claim, and desire to secure by Letters Patent, is—

1. The process of making amalgamated zincs for galvanic batteries, which consists in melting a quantity of zinc and adding thereto an amalgam of any metal except zinc, substantially as described.

2. The process of making amalgamated zincs for galvanic batteries, which consists in uniting mercury and any metal except zinc by heat, adding arsenic and carbonate of sodium, allowing the mass to cool and afterward dissolving it in molten zinc, whereby an amalgam is first formed and afterward an amalgam combined with the zinc, substantially as set forth.

In witness whereof I have hereunto affixed my seal and signed my name in the presence of two subscribing witnesses.

JOHN BEATTIE, JR. [L. S.]

Witnesses:
THOMAS F. STRANGE,
THOS. J. COBB.